(12) United States Patent
Brooker

(10) Patent No.: US 8,492,693 B2
(45) Date of Patent: Jul. 23, 2013

(54) AUTOFOCUS APPARATUS

(75) Inventor: Jeffrey S. Brooker, Oak Hill, VA (US)

(73) Assignee: Thorlabs, Inc., Newton, NJ (US)

( * ) Notice: Subject to any disclaimer, the term of this patent is extended or adjusted under 35 U.S.C. 154(b) by 313 days.

(21) Appl. No.: 12/906,086

(22) Filed: Oct. 16, 2010

(65) Prior Publication Data

US 2011/0090562 A1 Apr. 21, 2011

Related U.S. Application Data

(60) Provisional application No. 61/252,263, filed on Oct. 16, 2009.

(51) Int. Cl.
*G02B 7/04* (2006.01)
*G02B 27/40* (2006.01)
*G02B 27/64* (2006.01)

(52) U.S. Cl.
USPC ........................................ 250/201.4

(58) Field of Classification Search
USPC .............. 250/201.4, 214.1, 214 R; 356/73, 356/479
See application file for complete search history.

(56) References Cited

U.S. PATENT DOCUMENTS

| | | |
|---|---|---|
| 5,654,799 A | 8/1997 | Chase et al. |
| 6,900,943 B2 | 5/2005 | Andersen et al. |
| 2004/0135061 A1 | 7/2004 | Kreh |
| 2005/0121596 A1 | 6/2005 | Kam et al. |
| 2009/0021724 A1* | 1/2009 | Mahadevan-Jansen et al. ............. 356/73 |

FOREIGN PATENT DOCUMENTS

WO 2008/029506 3/2008

OTHER PUBLICATIONS

International Search Report and Written Opinion for corresponding International Application No. PCT/US2010/052981 mailed Jan. 20, 2011.

* cited by examiner

*Primary Examiner* — Seung C Sohn
(74) *Attorney, Agent, or Firm* — Graham Curtin, P.A.

(57) ABSTRACT

An autofocus apparatus includes, in one embodiment, a light source; a splitter; a fiber optic circulator; an optical collimator; a balance detector; and a microprocessor. The fiber optic circulator couples one of the split light signals at a first port, to the optical collimator at a second port, and to the balance detector at the third port. The optical collimator directs the light beam from the fiber optic circulator onto a sample through a Dichroic mirror and a microscope objective. The balance detector uses another one of the split light signals as an input, and converts a light signal, reflected off of a substrate the sample is placed on, into an analog voltage signal. The microprocessor processes the output of the balance detector and position feedbacks from an adjustable microscopy stage to generate a command for moving the position of the adjustable microscopy stage to achieve a desired focus.

11 Claims, 3 Drawing Sheets

AUTOFOCUS APPARATUS

CROSS-REFERENCE TO RELATED APPLICATIONS

This application claims the benefit of U.S. Provisional Application No. 61/252,263 filed on Oct. 16, 2009, the contents of which are herein incorporated by reference.

FIELD OF THE INVENTION

The invention generally relates to a microscopy apparatus, and more particularly to techniques for automatically adjusting the position of a stage for attaining proper focus.

BACKGROUND

As with all optical systems, microscopes suffer from diminished depth of field as the magnification and the NA (numerical aperture) of the imaging lens (objective) increases. When using a microscope, the user is responsible for attaining proper focus of the sample by moving the sample relative to the objective. When microscopy is automated and the user is no longer involved in looking at each image, a method of auto focusing is required. In the related art, techniques that achieve automatic focus by gauging the distance between the front lens and the bottom of the container (e.g., slide, well plate, etc.) are described. Such techniques are based on reflecting a beam of light off of the first surface and measuring the reflection. The deficiency of such techniques, however, is that if the container that the sample is on has an inconsistent thickness, as in most plastics, then the resulting image can be off in focus the amount of the deviation of the substrate.

Cellular imaging relies on the growth of cells on the bottom of a glass or plastic substrate. The cells grow parallel to the surface and secrete proteins that cause them to adhere to the substrate. In order to maintain the growth of the cells, nutrient rich liquid medium is added to feed the cells and maintain proper physiological conditions. In this scenario, the surface of the plastic is covered in an aqueous solution, which can be used to detect the position of the cells. The index of refraction change between the plastic and the liquid can be located using a low noise, high sensitivity reflected light setup.

SUMMARY

In an embodiment of the present invention, an autofocus microscope apparatus is provided. The apparatus includes: a light source; a splitter for splitting a light beam illuminated by the light source to a first portion of a light signal and a second portion of a light signal; an fiber optic circulator having a first port, second port and a third port; wherein the light signal in the fiber optic circulator travels only from the first port to the second port and from the second port to the third port; wherein the fiber optic circulator couples to the second portion of the light signal at the first port; an optical collimator for directing a light output from the second port of the fiber optic circulator onto a sample through a Dichroic mirror and a microscope objective, wherein the sample is placed on an adjustable microscopy stage; a balance detector for converting a light signal, reflected off of a substrate that the sample is placed on, into an analog voltage signal, wherein the reflected light signal is captured by the microscope objective and sent to the balance detector through the Dichroic mirror, the optical collimator, and into the second port and out of the third port of the fiber optic circulator; wherein the balance detector uses the first portion of the light signal as an input; and a microprocessor for processing the analog voltage signal from the balance detector.

In another embodiment of the present invention, an autofocus microscope apparatus is provided. The apparatus includes: a light source; an fiber optic circulator having a first port, second port and a third port; wherein the light signal in the fiber optic circulator travels only from the first port to the second port and from the second port to the third port; wherein the fiber optic circulator couples to a light signal output of the light source at the first port; an optical collimator for directing a light output from the second port of the fiber optic circulator onto a sample through a Dichroic mirror and a microscope objective, wherein the sample is placed on an adjustable microscopy stage; a photodiode detector for converting a light signal, reflected off of a substrate that the sample is placed on, into an analog voltage signal, wherein the reflected light signal is captured by the microscope objective and sent to the photodiode detector through the Dichroic mirror, the optical collimator, and into the second port and out of the third port of the fiber optic circulator; and a microprocessor for processing the analog voltage signal from the photodiode detector.

In yet another embodiment of the present invention, a method for operating a microscopy apparatus is provided. The method includes the steps: illuminating a light beam to a splitter for splitting the light beam into a first portion of a light signal and a second portion of a light signal; inputting the first portion of the light signal to a balance detector; coupling an fiber optic circulator to the second portion of the light signal at a first port, to an optical collimator at a second port, and to a balance detector at the third port, wherein the light signal in the fiber optic circulator travels only from the first port to the second port and from the second port to the third port; directing a light beam from the second port of the fiber optic circulator onto a sample by the light collimator through a Dichroic mirror and a microscope objective, wherein the sample is placed on an adjustable microscopy stage; capturing the reflected light beam signal by the microscope objective and sending to the balance detector through the optical collimator and into the second port and out of the third port of the fiber optic circulator; converting the light signal reflected off of a substrate that the sample is placed on, into an analog voltage signal by the balance detector; and processing the output of the balance detector.

The present invention may be realized as an autofocus microscopy apparatus in one embodiment. The microprocessor may generate a command for moving the position of the adjustable microscopy stage to achieve a desired optical focus, based on the output of the balance detector and position feedbacks from the adjustable microscopy stage.

In another embodiment, the present invention may be realized as a tracking device. The microprocessor may continuously monitor the analog voltage signal and generate a command in order to maintain a specific distance from the sample, or wherein the microprocessor continuously monitors the voltage signal and seeks to change the distance between the sample and the microscope objective to maximize the voltage from the detector, or maintain the voltage at a specified point.

In another embodiment, the microprocessor may determine the position of the sample based on the analog voltage signal and position feedbacks.

DETAILED DESCRIPTION OF THE PREFERRED EMBODIMENTS

Figure 1:
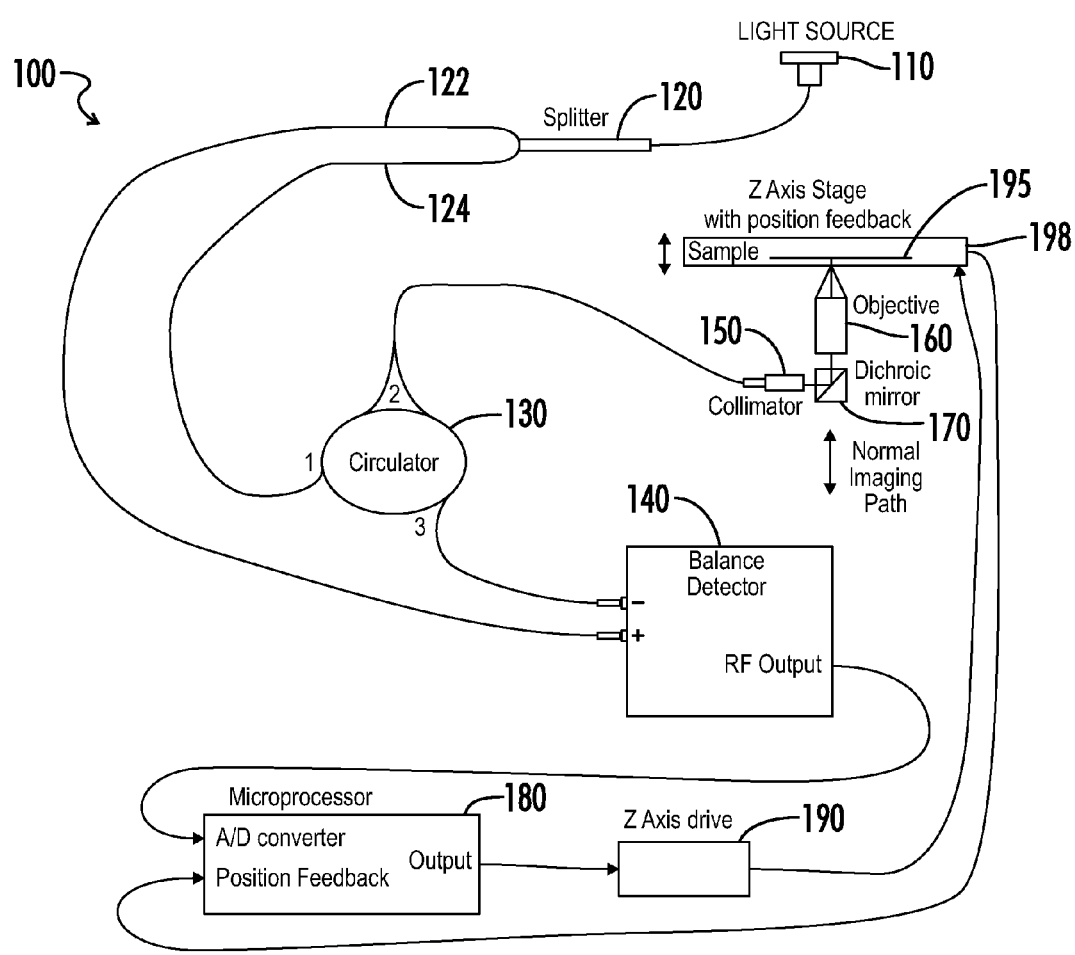
FIG. 1 is a diagram of an autofocus apparatus designed in accordance with an embodiment of the invention.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts. It is to be noted that all fiber optic systems can be replaced with free space equivalents.

FIG. 1 shows an exemplary and non-limiting diagram of an autofocus apparatus 100 designed in accordance with an embodiment of the invention. The apparatus 100 includes at least a light source 110, a fiber optic splitter 120, a balance detector 140, a fiber optic circulator 130, an optical collimator 150, a microprocessor 180, and a controller 190. The light source 110 could include, but not be limited to, a laser diode, for example. Other light sources are contemplated.

In accordance with principles of the invention, light illuminated by the light source 110 is fiber coupled or focused into the fiber optic splitter 120 which directs a first portion 122 of the original light into one of the ports of the balance detector 140. In one embodiment of the invention the wavelength of the light source 110 is a 1310 nm. Other values are contemplated. The fiber optic splitter 130 comprises a first port (1), a second port (2) and a third port (3). The second portion 124 output from the splitter 120 is fed into the first port (1) of the fiber optic circulator 130. The second portion 124 is significantly greater than the first portion 122 (for example, 99% versus 1%). The light travels in the circulator 130 and outputs at the second port (2), where the light signal is collimated into a beam by the collimator 150. It should be noted that a light signal can travel in the circulator 130 only from the first port (1) to the second port (2) and to third port (3).

The beam reflects off of a Dichroic mirror 170, which is designed to only reflect wavelengths above a predefined wavelength and pass anything below. In an exemplary embodiment the predefined wavelength is 1300 nm. The light beam travels through the microscope objective 160 and is focused on the sample 195 placed on an adjustable microscopy stage. The light reflects off of the plastic or glass substrate that the sample 195 is placed on, is captured by the objective 160, and then sent back into the fiber by the collimator 150. If the sample 195 is not contained in a glass or plastic substrate, the reflection can come from the sample 195 itself.

The light signal from the collimator 150 is input into the circulator 130 at the second port (2) and is output at the third port (3), as the light travels only in one direction through the circulator 130. The output from the circulator 130 is fed into another one of the ports of the balance detector 140. In the balance detector 140 circuitry the signal from the objective 160 is electronically divided by the signal from the first portion 122 of the original light provided by the splitter 120, thus cancelling out any change in the light source intensity over time. The balance detector 140 further converts the corrected signal from the objective 160 into an analog voltage signal that is then converted to a digital signal by the A/D converter in the microprocessor 180.

Figure 3:
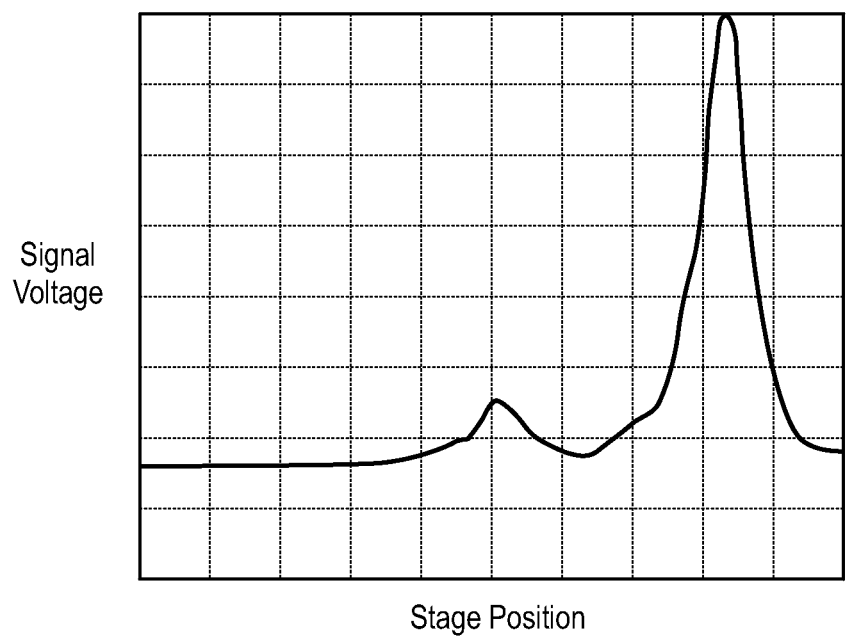
FIG. 3 is a plot of signal voltage as a function of stage position.

The microprocessor 180, based on the value of the digital signal and position feedbacks, moves the microscopy stage along the Z axis by commanding the controller 190. As shown in FIG. 1 for example, the sample 195 is placed on the microscopy stage 198 having an adjustable position along the Z-axis, thereby allowing adjustment of the separation between the sample 195 and objective 160 to maintain focus. The microprocessor 180 also records the voltage values measured by the balance detector 140 as well as the position of the adjustable microscopy stage at different distances between the sample 195 and the objective 160. The voltage signal peaks are analyzed and then the microscopy stage 198 is commanded to move, by the controller 190, to the position of the voltage signal peak that best correlates to the desired optical focus. FIG. 3 shows an example plot of the voltage signal peaks against the position of the microscopy stage.

Figure 2:
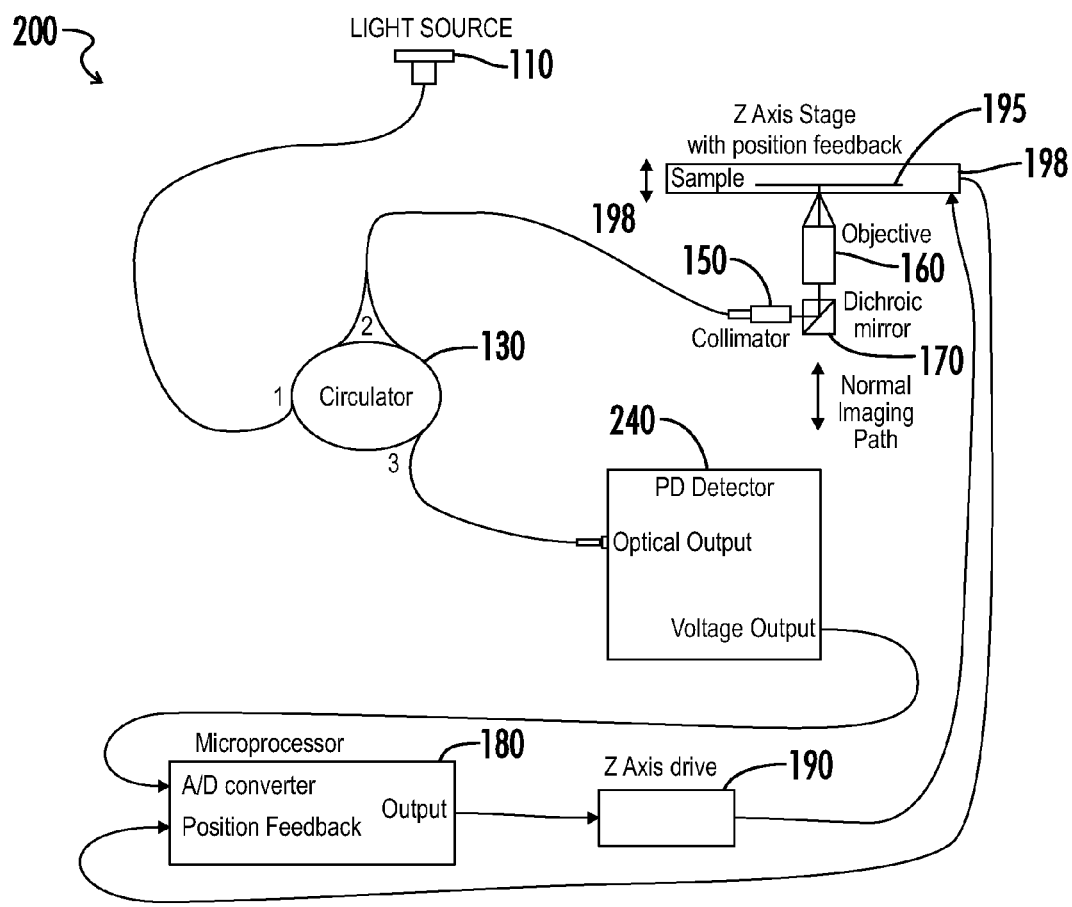
FIG. 2 is a diagram of an autofocus apparatus designed in accordance with another embodiment of the invention.

FIG. 2 shows an exemplary diagram of an autofocus apparatus 200 implemented in accordance with another non-limiting embodiment of the invention. In this embodiment the apparatus 200 does not include a fiber optic splitter and a simple photodiode detector 240 is used instead of a balance detector. Light illuminated by the light source 110 is fiber coupled or focused into the first port (1) of the fiber optic circulator 130. The light travels in the circulator 130 and outputs at the second port (2), where the light signal is focused into a beam by the collimator 150. Light signal obtained back from the collimator 150 is input into the circulator 130 at the second port (2) and is output at the third port (3). The output from the circulator 130 is fed into the photodiode detector 240. The photodiode detector 240 converts the light signal into a voltage signal output. The implementation illustrated in FIG. 2 is efficient when a time course of the change in the light intensity is longer than the period of time for the movement of the stage.

It should be appreciated by one of ordinary skill in the art that the autofocus mechanisms illustrated in FIGS. 1 and 2 are designed as a low background high sensitivity detector using a fiber optic circulator. The addition of the circulator to the light path prevents the light that is being sent from the laser to the sample from being visible to the detector. This means of illumination reduces the background signal to the detector, by the amount of blocking that the circulator provides. In one embodiment the blocking is better than 45 db.

The autofocus system of the present invention is particularly suited for high content screening and biological imaging. In one embodiment, the autofocus could be used with an automated fluorescence microplate imaging system that is designed to enable investigators to develop cell-based assays faster, at higher spatial resolution, and more economically than with current solutions. Some of the cell-based assays that are supported include, but are not limited to, nuclear-cytoplasmic translocation, plasma membrane translocation, protein expression, lipid droplet formation, DNA content, cell toxicity, cell viability (apoptosis/necrosis) and others.

As shown in FIG. 1, position feedback is facilitated using, in one embodiment, linear encoder scales embedded within the stage construction. While linear encoder scales are described herein, other positioning means are contemplated.

One non-limiting example is for microscopy where the stage is used to either position any part of a microscope with respect to a sample, or a sample with respect to a microscope. One example of this application is shown in connection with FIGS. 1-2 herein. Another non-limiting example includes machine vision inspection, or non contact-based dimensional inspection. Other industries and applications are contemplated.

It is contemplated that the position of the sample may change over time. It may be desirable to keep track of the position of the sample in order to maintain focus. In an embodiment of the present invention, the system can be realized as a tracking device. Using the principles of the present invention, the tracking device can maintain a specific distance between the device and the sample by tracking the signal voltage and continuously adjusting the z-position. When the position of the sample 195 changes, the reflected light signal received by the balance detector 140 or the photodiode detector 240 changes. As a result, microprocessor 180 detects a change in the voltage signal from the balance detector 140 or the photodiode detector 240. Microprocessor 180 generates a corresponding movement command in order to receive the same voltage from the detector, and thus maintains the same distance between the objective 160 and the sample 195.

The present invention can be used as a metrology tool. Specifically, the invention provides a good non-contact technique for measurement and distance gauging.

In another embodiment of the present invention, the system can be realized as a distance measuring device. In this case, there is no need to issue any movement command. The reflected light signal received by the balance detector 140 or the photodiode detector 240 is used to generate an analog voltage signal. As shown in FIG. 3, the voltage depends on the position of the stage. Microprocessor 180 analyzes the voltage signal and position feedbacks from the stage and thus determines the position of the sample.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. An autofocus apparatus, comprising:
    a light source;
    an fiber optic circulator having a first port, second port and a third port; wherein the light signal in the fiber optic circulator travels only from the first port to the second port and from the second port to the third port; wherein the fiber optic circulator couples to a light signal output of the light source at the first port;
    an optical collimator for directing a light output from the second port of the fiber optic circulator onto a sample through a Dichroic mirror and a microscope objective, wherein the sample is placed on an adjustable microscopy stage;
    a photodiode detector for converting a light signal, reflected off of a substrate that the sample is placed on, into an analog voltage signal, wherein the reflected light signal is captured by the microscope objective and sent to the photodiode detector through the Dichroic mirror, the optical collimator, and into the second port and out of the third port of the fiber optic circulator; and
    a microprocessor for processing the analog voltage signal from the photodiode detector.

2. The apparatus of claim 1, wherein a time course of the change in the light intensity of the light source is longer than the period of time for the movement of the adjustable microscopy stage.

3. The apparatus of claim 1, wherein the microprocessor generates a command for moving the position of the adjustable microscopy stage to achieve a desired optical focus based on voltage signal peaks measured by the photodiode detector.

4. The apparatus of claim 1, wherein the microprocessor continuously monitors the voltage signal and generates a command for moving the position of the adjustable microscopy stage in order to maintain a specific distance between the sample and the microscope objective.

5. The apparatus of claim 1, wherein the microprocessor continuously monitors the voltage signal and generates a command for moving the position of the objective in order to maintain a specific distance between the sample and the microscope objective.

6. The apparatus of claim 1, wherein the microprocessor determines the position of the sample based on the analog voltage signal from the photodiode detector and position feedbacks received from the adjustable microscopy stage.

7. A method for automatically operating an autofocus apparatus, the method comprising:
    coupling an fiber optic circulator to a light signal output of a light source at a first port, to an optical collimator at a second port, and to a photodiode detector at the third port, wherein the light signal in the fiber optic circulator travels only from the first port to the second port and from the second port to the third port;
    directing a light beam from the second port of the fiber optic circulator onto a sample by the light collimator through a Dichroic mirror and a microscope objective, wherein the sample is placed on an adjustable microscopy stage;
    capturing the reflected light beam signal by the microscope objective and sending to the photodiode detector through the optical collimator and into the second port and out of the third port of the fiber optic circulator;
    converting the light signal reflected off of a substrate that the sample is placed on, into an analog voltage signal by the photodiode detector; and
    processing the output of the photodiode detector.

8. The method of claim 7, wherein a time course of the change in the light intensity of the light source is longer than the period of time for the movement of the adjustable microscopy stage.

9. The method of claim 7, further comprising generating a command for moving the position of the adjustable microscopy stage to achieve a desired optical focus based on voltage signal peaks measured by the photodiode detector.

10. The method of claim 7, further comprising continuously monitoring the voltage signal and generating a command for moving the position of the adjustable microscopy stage in order to maintain a specific distance between the sample and the microscope objective.

11. The method of claim 7, further comprising determining the position of the sample based on the analog voltage signal from the photodiode detector.

* * * * *